United States Patent [19]
Kos

[11] Patent Number: 5,811,009
[45] Date of Patent: Sep. 22, 1998

[54] METHOD AND SYSTEM FOR IMPROVED BIOLOGICAL NITRIFICATION OF WASTEWATER AT LOW TEMPERATURE

[76] Inventor: Peter Kos, 12 Cavalry Pl., Ridgefield, Conn. 06877

[21] Appl. No.: 882,607

[22] Filed: Jun. 25, 1997

Related U.S. Application Data

[63] Continuation-in-part of Ser. No. 672,726, Jun. 28, 1996, abandoned, which is a continuation-in-part of Ser. No. 494,968, Jun. 26, 1995, abandoned, which is a continuation-in-part of Ser. No. 245,433, May 19, 1994, abandoned.

[51] Int. Cl.$^6$ .................................................. C02F 3/30
[52] U.S. Cl. .................... 210/605; 210/607; 210/622; 210/625; 210/903
[58] Field of Search .................................... 210/605, 607, 210/612, 622, 624, 625, 626, 630, 903, 195.1, 195.3, 202, 259

[56] References Cited

U.S. PATENT DOCUMENTS

| | | | |
|---|---|---|---|
| 4,173,531 | 11/1979 | Matsch et al. | 210/903 |
| 4,488,968 | 12/1984 | Hong et al. | 210/605 |
| 4,999,111 | 3/1991 | Williamson | 210/903 |
| 5,098,572 | 3/1992 | Faup et al. | 210/625 |
| 5,252,214 | 10/1993 | Lorenze et al. | 210/903 |
| 5,288,405 | 2/1994 | Lamb, III | 210/195.1 |
| 5,290,457 | 3/1994 | Koster et al. | 210/605 |
| 5,356,537 | 10/1994 | Thurmond et al. | 210/625 |

OTHER PUBLICATIONS

Tendaj–Xavier, Marta "Biological Treatment of Sludge Water From Centripugation of Digested Sludge" pp. 15–18, Aug. 1985.

*Primary Examiner*—Christopher Upton
*Attorney, Agent, or Firm*—Rhodes, Coats & Bennett, LLP

[57] ABSTRACT

The present invention entails a method and system for enhancing biological nitrification in a wastewater treatment process. The process entails both a mainstream wastewater process and a sidestream process wherein the sidestream process produces an abundant supply of supplemental nitrifiers that are in turn directed into the mainstream for assisting in carrying out the nitrification process in the mainstream. Specifically, the sidestream process includes directing a liquid stream (such as a dewatering liquid) having a high ammonia concentration at an elevated temperature into a sidestream nitrification zone which is operated at conditions which maximize production of nitrifiers therein. Afterwards, the resulting nitrifiers produced in the sidestream nitrification zone are directed into the mainstream where the nitrifiers function to enhance nitrification in the mainstream and allows operation at low sludge retention time conditions where nitrification otherwise could not be sustained.

26 Claims, 5 Drawing Sheets

Figure 5 Critical and Design Sludge Age as a Function of Temperature

METHOD AND SYSTEM FOR IMPROVED BIOLOGICAL NITRIFICATION OF WASTEWATER AT LOW TEMPERATURE

CROSS-REFERENCE TO RELATED APPLICATIONS

The present application is a Continuation-In-Part application of U.S. patent application Ser. No. 08/672,726, filed Jun. 28, 1996, now abandoned, which was itself a Continuation-In-Part of U.S. patent application Ser. No. 08/494,968, filed Jun. 26, 1995, now abandoned, and which was a Continuation-In-Part of U.S. patent application Ser. No. 08/245,433, filed May 19, 1994, now abandoned.

FIELD OF INVENTION

The present invention relates to wastewater treatment processes, and more particularly to an improved nitrification process wherein nitrifiers are produced in a sidestream and directed therefrom into a mainstream where they act to carry out nitrification at low sludge retention time values.

BACKGROUND OF THE INVENTION

One of the most troublesome environmental problems facing this nation and the world is the eutrophication of lakes, rivers and other water resources. This problem is caused by the presence of nutrients, such as nitrogen and phosphorus, that end up being deposited in our lakes, rivers and water resources. One of the most significant contributors to this problem are wastewater treatment facilities. So-called purified or treated wastewater often includes significant concentrations of both Phosphorus and nitrogen. These nutrients promote unwanted growth of algae and other aquatic plants which consume and use up dissolved oxygen in the lakes, rivers, etc. It is not uncommon for the dissolved oxygen levels to be reduced below the level needed to sustain fish and other animal life in the lakes and rivers. Obviously, the result is that many times the presence of nutrients in our water resources kills the fish and other aquatic life. Because of the eutrophication of our lakes and rivers there is a tremendous demand for nutrient control in the wastewater treatment plants throughout our land.

Accordingly, federal, state and local governmental bodies have continued to increasingly enact more stringent regulations for controlling the amount of ammonia and other nutrients which can be discharged into a receiving body of water by wastewater treatment facilities. This has presented a difficult and serious problem to many governmental bodies that have responsibility for wastewater treatment. In many cases, the minimum level of nutrients, particularly nitrogen, are difficult to meet with existing wastewater treatment facilities and the technology that is currently available. This is because, in part at least, older wastewater treatment facilities were primarily built to remove only suspended solids and biologically oxidizable organics and in reality are not designed to handle nitrification and nitrogen removal.

It is fair to conclude that numerous biological processes and systems have been developed for nitrification and nitrogen removal over the last few decades. However, the vast majority of the technology from this era requires very large tanks and equipment and long detention times for biological nitrification. The need for large tanks and equipment to accomplish nitrification is due to the fact that the biological population in these processes contain a very small fraction of nitrifies or nitrifying bacteria. The present day problem of nitrification is even made more difficult in certain regions of the country that experience long cold winters. The low winter sewage temperatures result in low nitrification rates in these processes and, it is very difficult to sustain a stable and sufficient population of nitrifies to oxidize ammonia.

Over the past five to ten years, the wastewater community has made significant strides in being able to control certain nutrients such as phosphorus. However, nitrogen now remains the most difficult nutrient to efficiently and economically remove from wastewater. In many cases, the problem comes down to providing an inexpensive and efficient biological nitrification process, that is a process that converts ammonia to nitrites and nitrates ($NO_x$). Therefore, there is and continues to be a need for an efficient wastewater process that is effective to efficiently nitrify ammonia in cold climates where the treatment facilities have not in fact been designed for nutrient removal.

SUMMARY AND OBJECTS OF THE INVENTION

The present invention relates to a nitrification process wherein nitrifiers are produced in a sidestream independently of a mainstream treatment process, and the sidestream produced nitrifiers are continuously or periodically transferred to the mainstream to participate with mainstream produced nitrifiers to carry out a mainstream nitrification process. To carry out this process, a secondary stream or source is identified that possesses a relatively high concentration of ammonia and this secondary stream is itself subjected to a nitrification process completely independent of the mainstream process. In this sidestream nitrification process, an abundant supply of supplemental nitrifiers are produced and these supplemental nitrifiers are conveyed or transferred to the mainstream where they perform a nitrifying function. This results in a very efficient nitrifying process due to the abundant supply of supplemental nitrifiers in the sidestream.

Further, carrying out nitrification, especially in cold climates, is very expensive particularly from a capital cost viewpoint. That is, in order to efficiently nitrify using a conventional nitrification process, the capacity and size of the treatment basin must be relatively large and that in itself translates into substantial expense. However, the present invention has discovered an approach that will reduce the size of nitrification treatment basins and will accordingly reduce the overall cost of building adequate treatment facilities for nitrification. Simply put, the present nitrification process suggests that the age of the sludge circulated through the mainstream can be substantially reduced compared to the sludge age that is standard in conventional nitrification processes. Normally, the process design for sludge age in a conventional nitrification process calls for the sludge age to be designed to be at least 200% of the critical or minimum sludge age. That is the minimum. Typically, standard engineering practice would call for a safety factor of 2.0, or at least, a safety factor approaching 2.0.

It is therefore an object of the present invention to provide an efficient process and system for a biological wastewater treatment process for effectuating nitrification.

Another object of the present invention resides in the provision of a process or system for a biological wastewater treatment process wherein supplemental or additional nitrifiers are produced in a sidestream nitrification zone and the produced supplemental nitrifiers are continuously or periodically transferred from the sidestream nitrification zone to the mainstream where the supplemental nitrifier effectuate nitrification in the mainstream process.

Still a further object of the present invention resides in the provision of a biological wastewater treatment process having an enhanced nitrification capability especially in cold climates.

Another object of the present invention resides in the provision of a biological nitrification process for treating wastewater that is particularly adapted to be compatible with existing wastewater treatment facilities and which does not require large scale capital outlays for additional equipment and facilities.

A further object of the present invention is to provide a biological nitrification process that is extremely stable and which is capable of nitrification at relatively low sludge ages which will enable the aeration tanks utilized by the nitrification process to be designed for a relatively low capacity compared with conventional nitrification processes.

Another object of the present invention is to provide a nitrification process design wherein the sludge age is maintained less than 200% of the critical or minimum sludge age of a conventional nitrification process operated under comparable wastewater temperature conditions.

Other objects and advantages of the present invention will become apparent and obvious from a study of the following description and the accompanying drawings which are merely illustrative of such invention.

DETAILED DESCRIPTION OF THE INVENTION

Before discussing the enhanced biological nitrification system and process of the present invention, it may be beneficial to basically review the conventional processes of nitrification and denitrification. Basically, the goal of nitrification and denitrification in a wastewater treatment process is to remove ammonia nitrogen, $NH_3$—N. This is basically a two-step process, referred to as nitrification and denitrification. First, the nitrification step basically entails converting the ammonia nitrogen, $NH_3$—N, to nitrite or nitrate, both referred to as $NO_x$. There are a number of conventional processes that can be utilized to provide nitrification. Suffice it to say at this time that many conventional activated sludge wastewater treatment processes accomplish nitrification in an aerobic or oxic treatment zone. Here, the wastewater containing the ammonia nitrogen is subjected to aeration and this gives rise to a microorganism culture that effectively converts the ammonia nitrogen to $NO_x$. Once the ammonia nitrogen has been converted to $NO_x$ then the $NO_x$ containing wastewater is typically transferred to an anoxic zone for the purpose of denitrification. In the denitrification treatment zone the $NO_x$ containing wastewater is held in a basin where there is no supplied air and this is conventionally referred to as an anoxic treatment zone. Here, a different culture of microorganisms operate to consume the oxygen from the $NO_x$ and thereby freeing the nitrogen to escape to the atmosphere. That basically describes the conventional nitrification and denitrification process. For a more complete and unified understanding of biological nitrification and denitrification one is referred to the disclosures found in U.S. Pat. Nos. 3,964,998; 4,056,465; and 4,874,519, the disclosures of which are expressly incorporated herein by reference.

Figure 1:
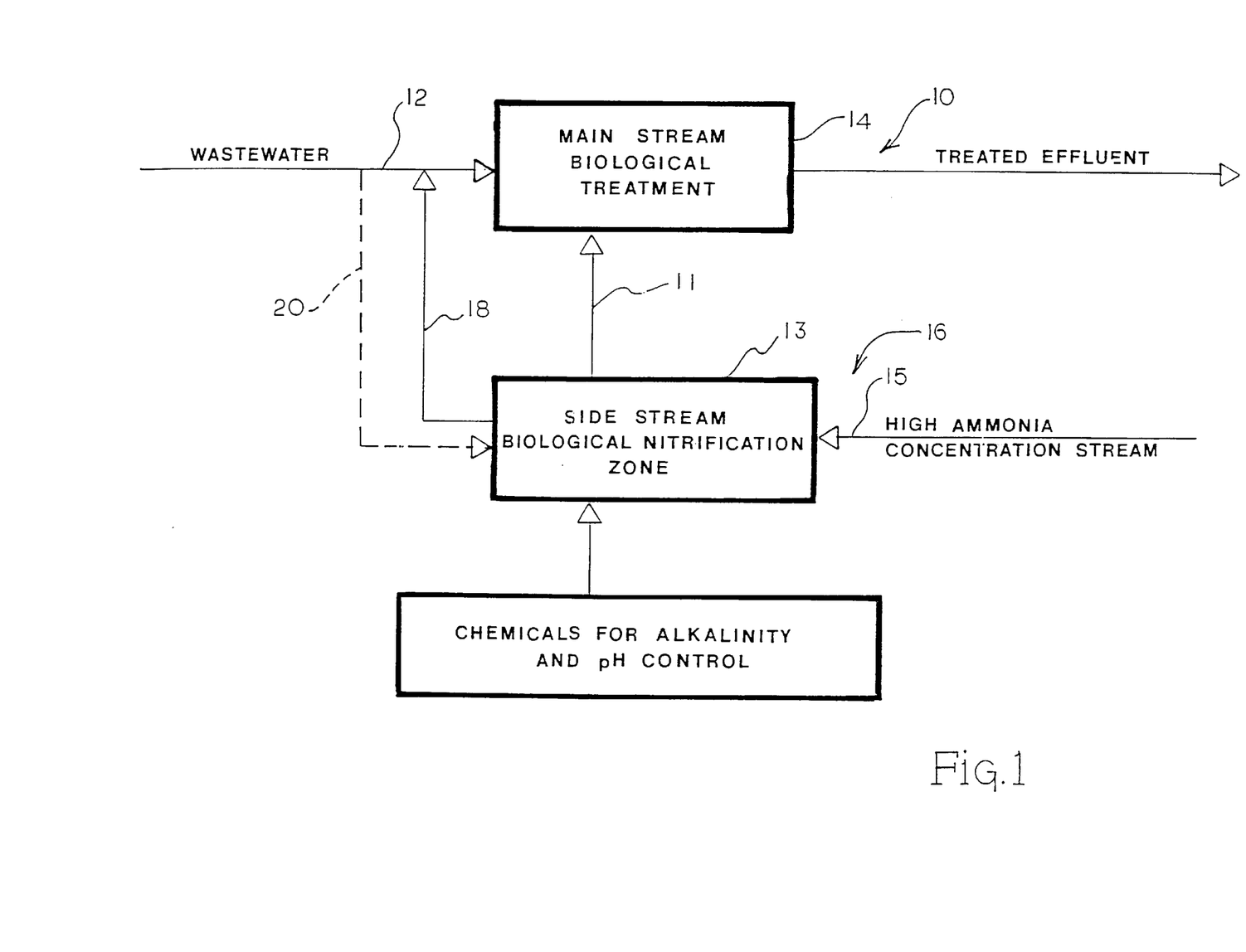
FIG. 1 is a schematic illustration of the enhanced biological nitrification process and system of the present invention.

Now, turning to the present invention and particularly to FIG. 1, the biological nitrification process of the present invention is shown therein and indicated generally by the numeral 10. In this process influent wastewater is directed along a mainstream 12 through a mainstream biological treatment process 14. The mainstream biological treatment process can include a series of various treatment zones including one or more anaerobic zones, one or more aerobic (oxic) zones, or one or more anoxic zones. However, it is contemplated that in the present process, the mainstream biological treatment process 14 would include at least a nitrification zone for converting ammonia nitrogen $NH_3$—N to $NO_x$. Basically, the mainstream biological treatment area or zones 14 would produce a treated or purified effluent that could be discharged into a creek, river, lake, etc.

As discussed previously, it is sometimes difficult to achieve complete biological nitrification especially in cold climates and especially in cases where the wastewater plant facilities are marginally designed or not originally designed for nitrification. Therefore, there is a need to enhance or improve the nitrification capacity of the conventional process just described. In order to achieve complete and efficient nitrification, the present invention entails a sidestream nitrification system indicated generally by the numeral 16. Basically, the sidestream nitrification system 16 produces supplemental nitrifiers that are conveyed or transferred to the mainstream 12 where the supplemental nitrifiers aid or assist in the mainstream nitrification process.

To produce the supplemental biological nitrifiers, the present invention entails directing a sidestream 15 into a sidestream nitrification zone or reactor 13. It is contemplated that the sidestream being fed or directed into the sidestream nitrification zone 13 would have a relatively high ammonia concentration compared to the ammonia concentration found in the influent wastewater being directed into and through the mainstream process. For example, it is contemplated that the concentration of ammonia in sidestream 15 would be in the range of 400 to 2,000 mg/l. This is compared to a concentration of 10 to 60 mg/l of ammonia nitrogen that one finds in a typical influent wastewater.

Also, it is contemplated that the temperature of the ammonia rich solution found in the sidestream nitrification zone 13 would be elevated in many cases relative to the temperature of the wastewater passing through the mainstream biological treatment area 14. Typically for example, one would expect the sidestream temperature or the temperature within the sidestream nitrification zone 13 to be in the range of 20°–35° C. This of course, tends to increase the reaction rate within the sidestream nitrification zone 13 and because the input stream 15 is high in ammonia concentration, it follows that an abundant supply of biological nitrifiers are produced or cultivated. These biological nitrifiers are referred to in some cases herein as supplemental nitrifiers because they are directed through line 11 or 18 back to the mainstream 12. Here, the supplemental nitrifiers combine with produced in the mainstream to greatly enhance and accelerate the mainstream nitrification process. Excess biological sludge full of nitrifiers accumulated in the sidestream nitrification zone 13 can be directed to the mainstream treatment zone 14 via line 11.

To achieve nitrification in the sidestream nitrification zone 13, the high ammonia concentrated solution being treated there can be nitrified in many conventional ways. For example, biological nitrification can be carried out by activated sludge process, trickling filters, rotating biological contactors, sequencing biological reactors and so forth and so on. In any event, biological nitrification is carried out in the sidestream through any conventional nitrification process.

In some cases it may be desirable to dilute the solution contained within the sidestream nitrification zone 13. This can be accomplished by directing a portion of the influent wastewater or treated effluent to the sidestream nitrification zone 13 by line 20.

Again, it should be appreciated that this is only an alternative provision and can be selectively utilized when there is in fact a need to either dilute, cool the high ammonia concentrated solution contained in the sidestream nitrification zone 13, or add additional organic substrate from the incoming wastewater stream. In addition, it should be appreciated that chemicals need to be directed into the sidestream nitrification zone 13 for the purpose of controlling pH and alkalinity. To maximize the nitrification rate, the pH should be controlled so as to fall within the range of 6.5 to 8.5. During nitrification, alkalinity is consumed and therefore alkalinity needs to be added into the sidestream nitrification zone 13 in amounts equal to approximately 4 mg of alkalinity as $CaCO_3$ (calcium carbonate) for each mg of ammonia-nitrogen. Other chemicals that can be used to control alkalinity and pH in the sidestream are soda ash, sodium hydroxide, and lime.

Figure 2:
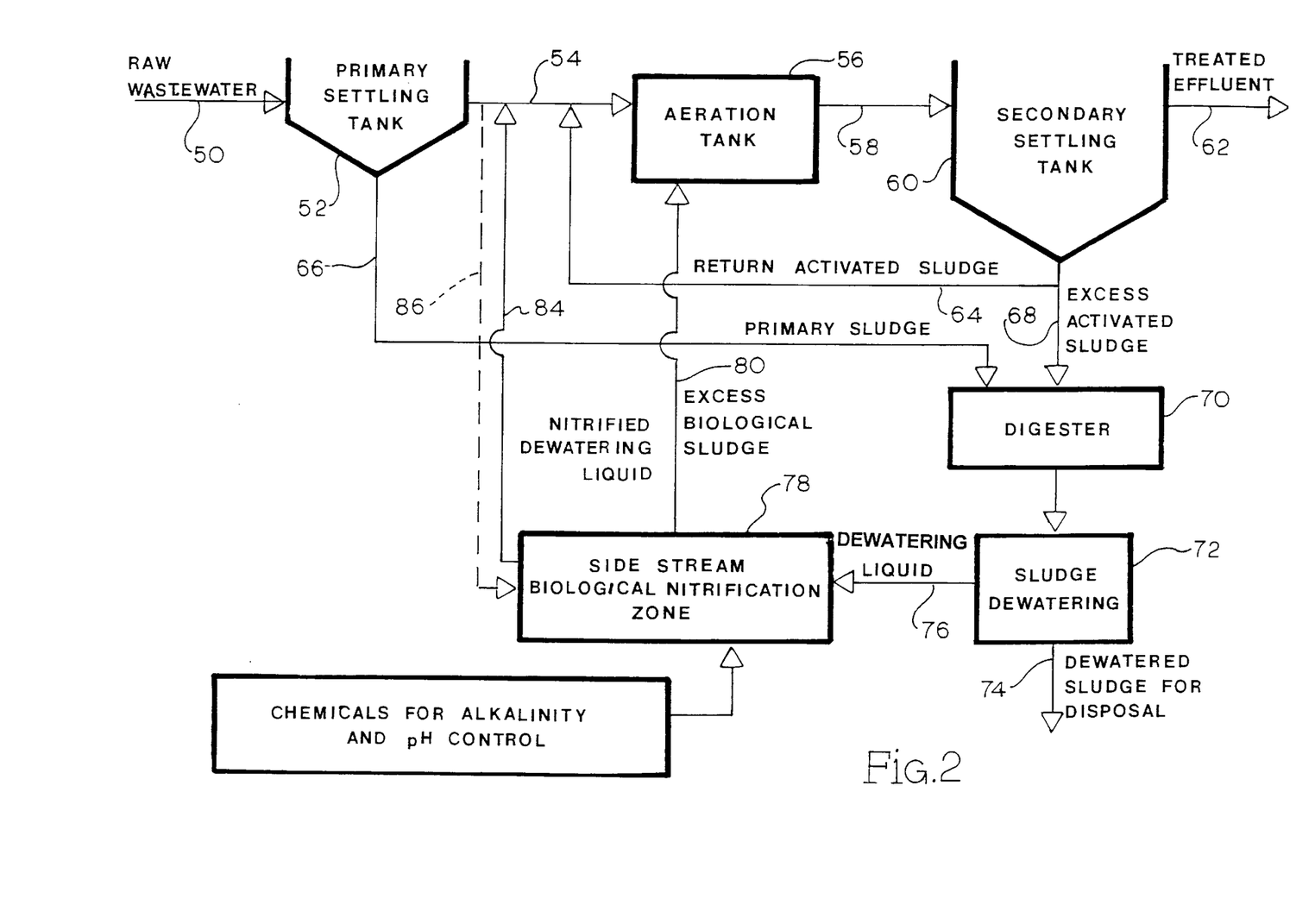
FIG. 2 is a schematic illustration of the enhanced biological nitrification process and system of the present invention showing a particular process and system design.

Now turning to FIG. 2 and the process shown therein, it is seen that wastewater is directed into inlet line 50 which leads to a primary clarifier 52. Primary clarifier 52 produces settled sludge and primary clarifier effluent which is directed into a mainstream inlet line 54. From inlet line 54 the primary clarifier supernatant is directed into a mainstream treatment area or a series of mainstream treatment zones. In the case of the present disclosure, the mainstream treatment area includes at least one aeration tank 56. This of course is utilized for mainstream nitrification. As pointed out above, it should be appreciated that the mainstream treatment area could include any number of other treatment zones such as anaerobic, aerobic, or anoxic. From the main treatment area or the main treatment zone or zones, the treated wastewater is directed through a secondary clarifier 60 that directs a treated or purified effluent out outlet line 62. Separated sludge is directed out the bottom of secondary clarifier 60 and a portion of it is returned to the mainstream via a return activated sludge line 64. The return activated sludge is mixed with the incoming influent wastewater in line 54 to form a mixed liquor that is subsequently treated in the mainstream treatment area or the mainstream treatment zone or zones (in this case the aeration tank 56).

Some of the sludge directed from the secondary clarifier 60 is referred to as excess activated sludge or waste sludge and that is directed through line 68 to a digester 70 or another sludge stabilization process. Also, primary sludge collected by the primary clarifier 52 is directed into line 66 and into the digester 70. Both the primary sludge and excess activated sludge is held within the digester 70 a selected time period for purposes of digestion. Once the digestion process has been completed the digested sludge is directed to a sludge dewatering station 72. There the sludge is separated into dewatered sludge which is directed out line 74 and dewatering liquid which is directed through line 76 to a sidestream nitrification system or zone 78. There the dewatering liquid is subjected to nitrification and as pointed out above, the dewatering liquid would have a high concentration of ammonia nitrogen and would typically be at an elevated temperature compared to the influent wastewater passing through the mainstream of the process. But in any event, supplemental biological nitrifiers are produced in the sidestream nitrification system 78 and these supplemental nitrifiers are conveyed to the mainstream via line 84. There the supplemental nitrifiers combined with nitrifiers produced in the aeration tank 56 and the combined nitrifiers act to effectuate complete and effective nitrification in the mainstream and particularly in aeration tank 56 of the example shown. It should be also noted that excess biological sludge full of nitrifiers held in the sidestream nitrification system 78 can be conveyed to the mainstream and particularly through the aeration tank 56 via line 80.

Also, as pointed out in the case of the process of FIG. 1, in the event there is a need to dilute the solution contained in the sidestream nitrification system 78 or need additional organic substrate that a portion of the primary supernatant leaving the primary clarifier or treated effluent can be directed into the sidestream nitrification system 78 via line 86. As also discussed in the preceding example, it is appreciated that chemicals can be directed into the sidestream nitrification system 78 for the purpose of controlling pH and alkalinity.

Because amount of ammonia in the sidestream is limited, the production of nitrifying bacteria in the sidestream nitrification system 78 must be maximized. Nitrifiers production decreases with increasing mean cell residence time and therefore, the sidestream nitrification system has to be designed and operated at the low mean cell residence times (sludge age). To maximize nitrifiers production the sidestream nitrification system 78 should be operated at mean cell retention times below 20 days (where nitrifiers production is approximately one-half of the maximum theoretical yield) preferably at 10 days where nitrifiers production is approximately two-thirds of the maximum theoretical yield.

To improve further efficiency of the sidestream nitrification system it is desirable to remove excessive suspended solids from the dewatering liquid 76. This can be done, for example, by polymer addition and sedimentation in a separate tank.

The advantage of the process of the present invention is that the present process designed for nitrification will enable one to design the mainstream nitrification for a relatively low sludge age, for example approximately five days or lower in the northern climates with wastewater temperatures approximately 10° C. This is contrasted with a conventional nitrification process design where the design is based on a sludge age of eleven to fourteen days. This clearly means that in the case of a process design calling for sludge age of eleven to fourteen days, as compared to five days, that the aeration tanks must be much larger in size especially to afford a reasonable safety factor. This is because, as will be seen from discussing the subsequent example, the nitrification process of a typical conventional activated sludge process is quite unstable once the sludge age gets down close to the critical sludge age value which is about five to six days at 10° C.

To better illustrate the point being made here and to show the economy and desirability of the present invention, an example will be shown showing the relationship between sludge age, concentration of nitrifiers, and concentration of effluent ammonia nitrogen for a conventional activated sludge process and for the enhanced biological nitrification process of the present invention. Therefore, one must determine the relationship between the sludge age, nitrifier concentration, and effluent ammonia nitrogen concentration for the process of the present invention and for a conventional activated sludge process. To do this, one assumes an influent wastewater flow of one million gallons per day (mgd) having 15 mg/l of available ammonia nitrogen and a sidestream flow of 6,250 gallons per day of dewatering liquid (concentrated ammonia nitrogen) having a concentration of 800 mg/l of ammonia nitrogen. The sidestream nitrification reactor is assumed to have a hydraulic detention time of one day and operates at four days of sludge age and at a temperature of 25° C. The mainstream aeration tank is assumed to be a completely mixed reactor having a hydraulic detention time of six hours. In this example, approximately twenty-five (25%) percent of all ammonia nitrogen available for nitrification is in the dewatering liquid that is directed to the sidestream nitrification reactor and seventy-five (75%) percent of the ammonia nitrogen is in the mainstream wastewater. The temperature of the sewage within the mainstream is assumed to be 10° C. which represents a typical winter temperature of sewage in the northern parts of the United States.

Given the above assumptions, one can calculate (by conventional means) the relationship between sludge age, nitrifier concentration, and effluent ammonia nitrogen concentration for both a conventional activated sludge process and the process of the present invention.

The method for the design of activated sludge processes most commonly used today was developed by Perry L. McCarty and Alonzo W. Lawrence and published in the *Journal Of The Sanitary Engineering Division—Proceedings Of The American Society Of Civil Engineers*, June 1970, page 757–778, in an article entitled *Unified Basis For Biologocal Treatment Design And Operation*. According to the approach of McCarty and Lawrence, the concentration of nitrifiers X in the aeration tank and the concentration of the ammonia nitrogen S in the effluent are:

$$X = \frac{Y(S_0 - S)}{1 + k_d \theta_c} \times \frac{\theta_c}{\theta} \quad (1)$$

$$S = \frac{K_N(1 + k_d \theta_c)}{\theta_c(\mu m - k_d) - 1} \quad (2)$$

In the case of the present process utilizing a sidestream nitrification reactor the appropriate equations for determining concentration of nitrifiers in the mainstream aeration tank and the resulting effluent ammonia nitrogen concentration were developed and are as follows:

$$X = \frac{X_0 + Y(S_0 - S)}{1 + k_d \theta_c} \times \frac{\theta_c}{\theta} \quad (3)$$

$$S^2 \left[ \mu m - \left( \frac{1}{\theta_c} + k_d \right) \right] - $$

$$S \left[ \mu m \left( \frac{x_0}{Y} + S_0 \right) + (K_N - S_0)\left( \frac{1}{\theta_c} + k_d \right) \right] + \quad (4)$$

-continued $$S_0 K_N \left( \frac{1}{\theta_C} + k_d \right) = 0$$

Where:
 X=concentration of Nitrosomonas cells (nitrifiers)
 Y=maximum yield coefficient
 $S_o$=Influent concentration of substrate (ammonia)
 S=Effluent concentration of substrate (ammonia)
 $k_d$=Endogenous decay coefficient
 $\theta_C$=Mean cell residence time (sludge age, sludge retention time, SRT)
 $\theta_c$=Hydraulic detention time
 $K_N$=Half-rate constant for Nitrosomonas
 $\mu m$=Maximum growth rate of Nitrosomonas
 $X_o$=Influent concentration of Nitrosomonas cells (nitrifiers)

The maximum specific growth rate of Nitrosomonas was defined in the U.S. Environmental Protection Agency Technology transfer manual entitled *Process Designs Manual For Nitrogen Control*, October 1975, by the following relationship:

$$\mu N = 0.47[e^{0.098(T-15)}] \left[ \frac{DO}{DO + 1.3} \right] [1 - 0.833(7.2 - pH)] \quad (5)$$

Where:
 $\mu N$=maximum possible nitrifier growth rate, day$^{-1}$, environmental conditions of pH, temperature, and DO,
 T=Temperature in degrees centigrade
 DO=Dissolved oxygen, mg/l This process design method also defines the minimum solids retention time at which conventional nitrification ceases by:

$$\theta_c^m = \frac{1}{\mu N - k_d} \quad (6)$$

where: $\theta_c^m$=minimum solids retention time, days, for nitrification at pH, temperature and DO.

It also defines the design solids retention time by:

$$\theta_c^d = SF \frac{1}{\mu N \frac{N}{N + 0.5} - k_d} \quad (7)$$

where:
 $\theta_c^d$=design solids retention time, days.
 SF=safety factor
 N=desired effluent ammonia concentration, mg/l Utilizing the above approach and equations, the relationships between sludge age, nitrifiers concentration, and ammonia nitrogen effluent concentration was calculated for a conventional activated sludge process and for the process of the present invention. See Tables 1 and 2 appearing below:

TABLE 1

Conventional Activated Sludge Process

| Sludge Age (Days) | Effluent Ammonia Concentration | Concentration Of Nitrifiers In The Aeration Tank (mg/l) |
|---|---|---|
| 1 | 20 | 0 |
| 2 | 20 | 0 |
| 3 | 20 | 0 |

TABLE 1-continued

Conventional Activated Sludge Process

| Sludge Age (Days) | Effluent Ammonia Concentration | Concentration Of Nitrifiers In The Aeration Tank (mg/l) |
|---|---|---|
| 4 | 20 | 0 |
| 5 | 20 | 0 |
| 6 | 4.64 | 42.5 |
| 7 | 2.04 | 56 |
| 7.5 | 1.61 | 60 |
| 10 | 0.83 | 77 |

TABLE 2

Process According To The Present Invention

| Sludge Age (Days) | Effluent Ammonia Concentration (mg/l) | Concentration Of Nitrifiers In The Mainstream Aeration Tank (mg/l) |
|---|---|---|
| 1 | 13.8 | 3.0 |
| 2 | 11.9 | 8.3 |
| 3 | 7.7 | 19.7 |
| 4 | 4.4 | 34 |
| 5 | 1.9 | 49 |
| 6 | 1.1 | 62 |
| 7 | 0.83 | 76 |
| 10 | 0.47 | 107 |

Figure 3:
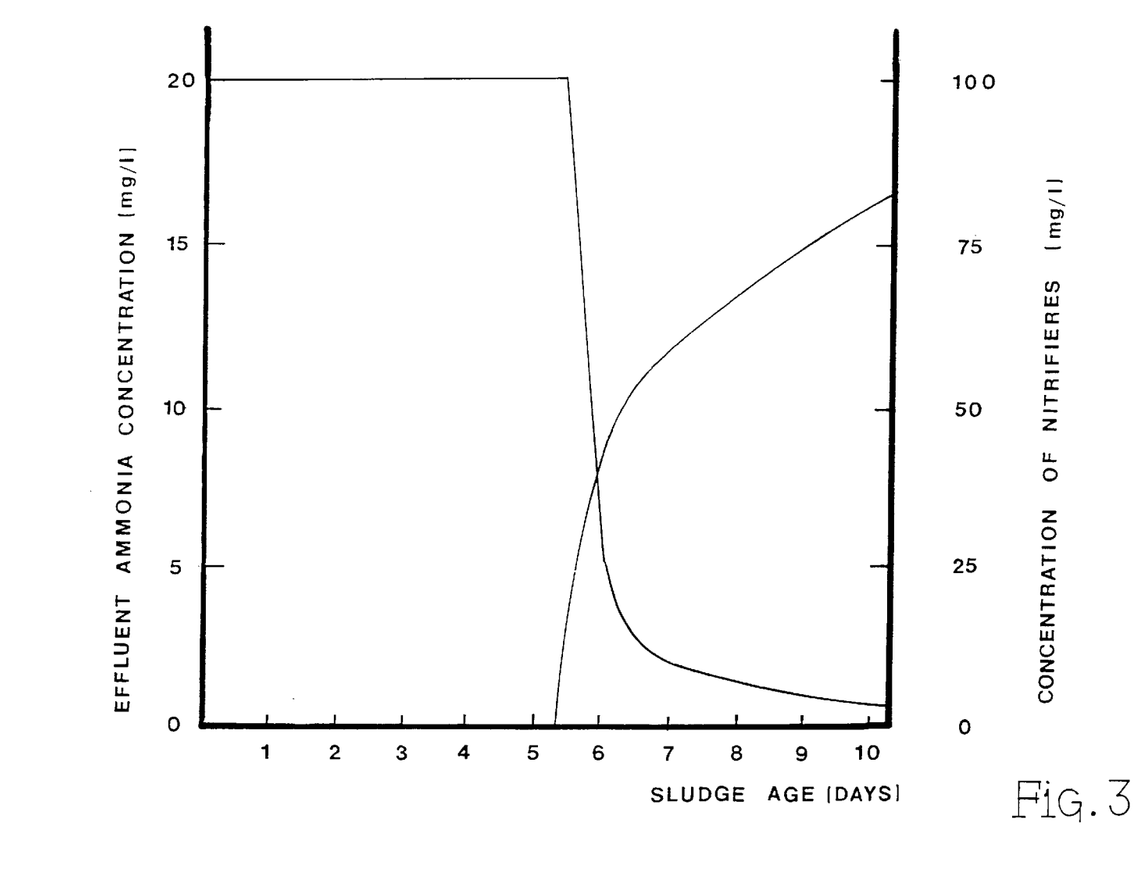
FIG. 3 is a graph which illustrates the relationship between sludge age, effluent ammonia concentration, and nitrifier concentration in a conventional activated sludge process.
Figure 4:
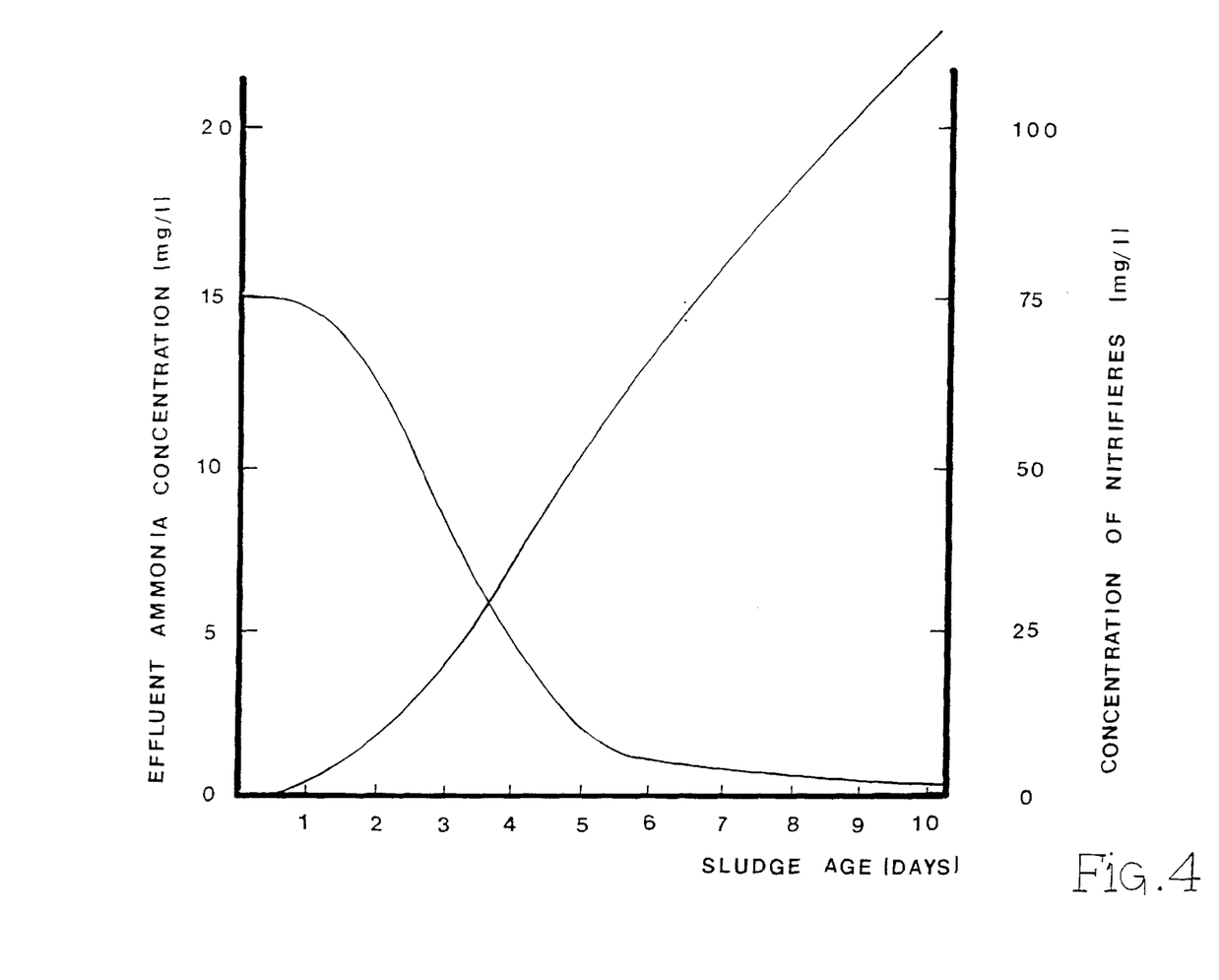
FIG. 4 is a graphical illustration of the relationship between sludge age, effluent ammonia concentration, and nitrifier concentration in the enhanced biological nitrification process and system of the present invention.

Now, turning to FIGS. 3 and 4, the relationship of sludge age with respect to nitrifier concentration and effluent ammonia concentration for a conventional activated sludge process and for the process of the present invention is shown in FIGS. 3 and 4. FIG. 3 shows a conventional activated sludge process and particularly the nitrification process thereof. As the sludge age decreases it is seen that the nitrifier concentration also decreases but the ammonia concentration of the effluent increases. When sludge age is decreased close to 6 days, nitrifiers tend to be "washed out" and it is difficult for the process to maintain a steady population of nitrifiers. The result is an unstable nitrification process at sludge ages around 6 days and it is seen that nitrification is essentially impossible at minimum retention time (minimum sludge age) below about 5.5 days. The minimum solids retention time is calculated using equations 5 and 6. This essentially means that the sludge age becomes the limiting parameter or factor in a conventional activated sludge nitrification process. Therefore, in order to achieve nitrification using a conventional activated system the aeration tank or reactor would need to be designed for a sludge age of more than 6 days. In addition and conforming with conventional design standards, it is important to provide a safety factor of 1.5 to 2.0 which yields, according to Equation 7, a design sludge age of 11 to 14 days. This of course will require a relatively large nitrification tank size.

Turning to FIG. 4 and the present process and particularly the present nitrification process, it is seen that because of a continuous supply of nitrifiers in the feed from the sidestream nitrification reactor that nitrifiers are present at any sludge age. Therefore, ammonia removal can take place even at sludge ages below 5 days. This is because the nitrifiers cannot be "washed out" at lower sludge ages and that means that in terms of design standards that one is not required to employ a substantial safety factor as was the case with a conventional activated sludge process discussed above and shown in FIG. 3. Thus, the sidestream nitrification reactor of the present process can operate at sludge ages of 5 days and achieve approximately ninety (90%) percent nitrification (that is ammonia concentrations in the effluent of 2 mg/l) Therefore, the wastewater treatment process of the present invention allows nitrification in the aeration tank or reactors having approximately 6 hours of hydraulic detention time and operating at sludge ages of 5 days. This should be compared with a conventional activated sludge process which would require approximately twice the tank capacity operating at sludge ages of at least 11 to 14 days.

Therefore, it is appreciated that the biological wastewater treatment process of the present invention and particular the nitrification process thereof has many advantages over a conventional activated sludge process. In particular, the process of the present invention is much more stable than a conventional activated sludge process and does not result in total failure due to an oversight or error in judgment. In other words, the process of the present invention has the ability to quickly recover once the effluent concentration of the ammonia nitrogen starts to reach or surpass a critical level. That is not the case with the conventional activated sludge process depicted in FIG. 3. That process is very unstable and once the sludge age passes a critical point the entire process becomes unstable and will fail to achieve nitrification.

Figure 5:
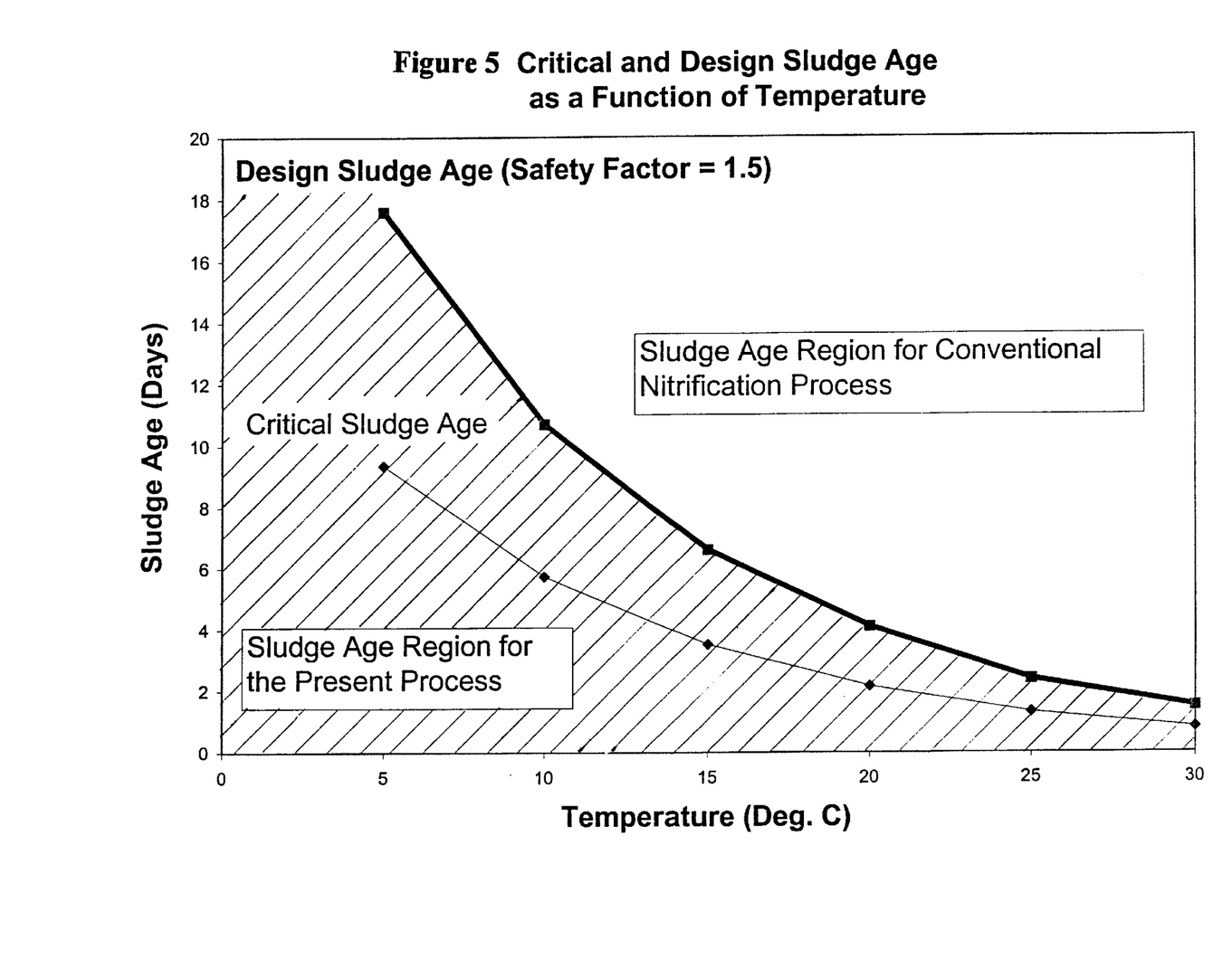
FIG. 5 is a graphic illustration showing various relationships between sludge age and temperature for a conventional nitrification process.

To demonstrate further the present invention one is referred to Table 3 and FIG. 5 which show the minimum sludge age (i.e. critical or minimum sludge age or SRT) and design sludge age for a conventional nitrification process as a function of temperature. Design SRT values are based on the minimum safety factor of 1.5 or 2.0 recommended in the EPA Manual. The values of Table 3 were obtained using the above equations 5, 6 and 7.

TABLE 3

Minimum SRT And Design SRT As A Function Of Temperature

| Temperature (°Centigrade) | Minimum SRT (Days) | Lowest Design SRT (SF = 1.5) | (SF = 2.0) |
|---|---|---|---|
| 5 | 9.4 | 17.6 | 23.6 |
| 10 | 5.7 | 10.7 | 14.2 |
| 15 | 3.5 | 6.6 | 8.8 |
| 20 | 2.2 | 4.1 | 5.6 |
| 25 | 1.3 | 2.4 | 3.2 |

FIG. 5 is a graphic illustration of the data tabulatd in Table 3. In particular, critical SRT is plotted as a function of temperature. Design SRT for safety factor 1.5 is also plotted as a function of temperature. In all cases, the values set forth in Table 3 and plotted in FIG. 5 are for a conventional nitrification process. The minimum design SRT tabulated in Table 3 and plotted in FIG. 5 is based on a safety factor (SF) of 1.5 or 150%.

The present invention entails a discovery, a discovery that the particular process disclosed herein can be efficiently operated at a sludge age (SRT) below a normal or standard sludge age for a conventional nitrification process. By maintaining the design sludge age in the present process substantially below the design sludge age (design SRT) of conventional nitrification processes, it follows that the size of the basins utilized in the mainstream to accommodate the mainstream nitrification process can be substantially reduced for a given volume of influent wastewater to be treated. This obviously lowers the capital costs of a wastewater treatment facility that is to accomplish nitrification for a given influent.

As a bench mark for sludge age, a conventional nitrification process is referred to and discussed above. A conventional nitrification process is a simple mainstream process such as the well-known Bardenpho process or the process disclosed in the Barnard patent, U.S. Pat. No. 3,964,998, the disclosure thereof being herein expressly incorporated by reference.

Table 3 and the graph illustration of FIG. 5 explores the critical or minimum sludge age at various temperatures for conventional nitrification processes. As discussed herein, the determination of critical or minimum sludge age for a conventional mainstream nitrification process, such as that disclosed in the Barnard patent (U.S. Pat. No. 3,964,998), is highly dependent upon temperature. As Table 3 aptly illustrates, in a conventional nitrification process, the minimum sludge age increases with temperature. For example, at a wastewater design temperature of 5° C., the minimum or critical sludge age for a conventional nitrification process is 9.4 days. On the other hand, for a wastewater design temperature of 15° C., the minimum or critical sludge age for the mainstream of a conventional nitrification process is 3.5 days. These are critical or minimum sludge ages—not design sludge ages. It is well-accepted in the wastewater industry that one cannot base a nitrification process design on minimum or critical sludge age. A safety factor (SF) must be applied. Universally, the applied safety factor (SF) is typically 2.0 or at least 1.5.

Turning to FIG. 5, there is shown a plot of critical or minimum sludge age (critical SRT) as a function of temperature. As Table 3 illustrates, the critical or minimum sludge age for a conventional nitrification process decreases as the wastewater design temperature increases. Taking the minimum acceptable safety factor of 1.5, and assuming an effluent ammonia concentration of 2 mg/l, a shaded region is formed below the design sludge age line of FIG. 5 based on a 1.5 safety factor. Consequently, beginning with design wastewater temperatures of 5° C., the design sludge age for conventional nitrification processes begins at 17.6 days. For wastewater temperatures of 10° C., the design SRT for a conventional nitrification process begins at approximately 10.7 days. Similarly for a wastewater design temperature of 15° C., the design sludge age for a conventional nitrification process begins at approximately 6.6 days. It is important to appreciate that this is the lower boundary line (i.e. a safety factor of 1.5 or 150%) for design criteria relating to design sludge age in conventional nitrification processes. It can be seen that for each temperature, that these design sludge age values are approximately twice (200%) of the critical or minimum sludge age.

In the case of the present nitrification process, the design sludge age for any wastewater temperature range shown on FIG. 5 can be represented by the shaded region below the line designated design sludge age (SF=1.5) shown in FIG. 5. This essentially means that the process of the present invention can be carried out by maintaining or controlling the sludge age within the mainstream of the present process at a value less than about 200% of the critical or minimum sludge age of a conventional nitrification process. In comparing sludge age of the present process with a conventional process, it is to be understood that the comparison is intended to compare the sludge age of a conventional process being carried out under the same conditions (for example temperature). Thus, for example, in the case of the present invention the sludge age within a process designed for 5° C. wastewater conditions is maintained below 17.6 days. In the case of the wastewater design temperature being 10° C., the design sludge age for the mainstream of the present process is maintained or controlled below 10.7 days. In the case of a design based on 15° C. wastewater temperature, the design sludge age for the present process is maintained or controlled below approximately 6.6 days.

Thus, in the case of the present process, the upper boundary line for design sludge age is fixed at 200% of the critical or minimum sludge age for a conventional nitrification process operated under the same temperature conditions. In many cases, the design sludge age of the present invention would be substantially below this boundary line. Accordingly, the facilities for handling the wastewater influent to be treated by the present process will be substantially less in size and cost than the facilities that would be required in cases involving conventional nitrification processes.

Processes which employ biological phosphorous removal and/or denitrification require anaerobic or anoxic zones and proportional increases in sludge age to account for sludge in these anaerobic and anoxic zones. All of the descriptions and specifications herein of the sludge age refers to the so-called oxic sludge age, that is the sludge age necessary for nitrification in the oxic or aerated zones only.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An activated sludge wastewater treatment process having enhanced biological nitrification comprising the steps of:
   (a) directing influent wastewater through a mainstream treatment process including at least one aerobic treatment zone and a final clarifier that separates purified supernatant from settled sludge;
   (b) returning at least a portion of the settled sludge from the final clarifier to the mainstream treatment process;
   (c) producing supplemental nitrifiers in a sidestream, independent of the mainstream process and the return settled sludge, by directing a water stream having a relatively high ammonia concentration compared to the influent wastewater stream into a sidestream biological nitrification system and producing supplemental nitrifiers in the sidestream biological nitrification system;
   (d) adding chemicals to the sidestream biological nitrification system for controlling pH and alkalinity;
   (e) transferring the supplemental nitrifiers from the sidestream biological nitrification system to the mainstream treatment process where the supplemental nitrifiers assist in nitrifying the influent wastewater passing through the mainstream treatment process; and
   (f) maintaining the sludge age within the mainstream treatment process at a value of less than 200% of the critical sludge age for a conventional nitrification process.

2. The method of claim 1 wherein the step of adding chemicals to control the pH includes the step of controlling the pH within the sidestream biological nitrification system to approximately 6.5 to 8.5.

3. The enhanced biological nitrification process of claim 1 including the step of maintaining the temperature in the sidestream biological nitrification process higher than the temperature of the influent wastewater passing through the mainstream treatment process.

4. The method of claim 1 wherein the mainstream treatment process also includes a denitrification treatment zone for denitrification.

5. The method of claim 1 including the step of directing sludge from the mainstream treatment to a digester and digesting the sludge therein and then subjecting the digested sludge to a sludge dewatering process that produces dewatered sludge and a dewatering liquid wherein the dewatering liquid becomes the relatively high concentrated ammonia sidestream that produces the supplemental nitrifiers.

6. The method of claim 1 including the step of directing at least a portion of the wastewater influent into the sidestream biological nitrification system.

7. The method of claim 1 wherein the chemicals added to the sidestream biological nitrification system are taken from the group consisting of: calcium carbonate, soda ash, sodium hydroxide and lime.

8. The method of claim 1 including maintaining the sludge age within the mainstream nitrification process at less than 17.6 days for a wastewater design temperature of 5° C.

9. The method of claim 1 including maintaining the sludge age within the mainstream nitrification process at less than 10.7 days for a wastewater design temperature of 10° C.

10. The method of claim 1 including maintaining the sludge age within the mainstream nitrification process at less than 6.6 days for a wastewater design temperature of 15° C.

11. A biological wastewater treatment process having enhanced nitrification comprising the steps of:
(a) directing influent wastewater into and through a mainstream;
(b) treating the influent wastewater in the mainstream by nitrifying the same in an aerobic zone;
(c) directing the nitrified wastewater into a final clarifier and forming purified supernatant and settled sludge;
(d) returning a portion of the settled sludge back to the mainstream where it is mixed with the influent wastewater;
(e) directing another portion of the settled sludge separated from the influent wastewater to a digester and subjecting that settled sludge to digestion to form digested sludge;
(f) separating the digested sludge into dewatered sludge and dewatering liquid;
(g) directing the dewatering liquid into a sidestream biological nitrification system to nitrify the same and to form nitrifiers;
(h) transferring the nitrifiers formed in the sidestream back to the mainstream and mixing the nitrifiers with the influent wastewater in the mainstream such that the nitrifiers produced in the sidestream contribute to the nitrification process in the mainstream; and
(i) maintaining sludge age within the mainstream to a value of less than 200% of the critical sludge age for a conventional nitrification process.

12. The method of claim 11 wherein the ammonia concentration of the dewatering liquid of the sidestream is generally maintained at a higher concentration level than the ammonia concentration of the influent wastewater passing through the mainstream.

13. The method of claim 12 wherein the temperature of the dewatering liquid of the sidestream is generally maintained at a higher level than the temperature of the influent wastewater passing through the mainstream.

14. The method of claim 13 wherein the mainstream treatment process also includes a denitrification treatment zone for denitrifying.

15. The method of claim 11 including the step of adding a chemical to the sidestream biological nitrification system and controlling pH and alkalinity in the sidestream biological nitrification system.

16. The method of claim 11 including the step of directing at least a portion of the influent wastewater into the sidestream biological nitrification system.

17. The method of claim 11, including maintaining the sludge age within the mainstream at a value of less than 17.6, 10.7 and 6.6 days for wastewater design temperatures of 5° C., 10° C., and 15° C., respectively.

18. An activated sludge biological wastewater treatment process having enhanced biological nitrification comprising the steps of:
(a) directing wastewater through a mainstream nitrification process including at least one aerobic treatment zone and a final clarifier that separates purified supernatant from settled sludge;
(b) returning at least a portion of the settled sludge from the final clarifier to the mainstream treatment process;
(c) producing supplemental biological nitrifiers in a sidestream by directing a stream having a relatively high concentration of ammonia into a sidestream biological nitrification system and nitrifying the same and in the process producing the supplemental biological nitrifiers in the sidestream biological nitrification system;
(d) transferring the supplemental biological nitrifiers produced in the sidestream nitrification system to the mainstream nitrification process where the supplemental nitrifiers assist in nitrifying the wastewater passing through the mainstream nitrification process; and
(e) mintaining sludge age within the mainstream nitrification process at a value of less than 200% of the critical sludge age of a conventional nitrification process.

19. The method of claim 18 including the step of directing at least a portion of the influent wastewater into the sidestream nitrification system.

20. The method of claim 18 including the step of maintaining the temperature within the sidestream nitrification system higher than the temperature of the wastewater passing through the mainstream nitrification system.

21. The method of claim 18 wherein the process further includes a mainstream denitrification process for denitrifying.

22. The method of claim 18 including the step of adding chemicals to the sidestream biological nitrification system for controlling pH and alkalinity.

23. The method of claim 22 wherein alkalinity in the sidestream is continuously reduced by the nitrification process in the sidestream and wherein an additive taken from the group consisting of calcium carbonate, soda ash, sodium hydroxide and lime is continuously added during periods of the nitrification process in order to maintain an appropriate alkalinity in the sidestream.

24. The method of claim 18 including adding chemicals to the sidestream and controlling pH and alkalinity in the sidestream.

25. The method of claim 18 wherein the chemical added to the sidestream biological nitrification system for controlling pH is $CaCO_3$.

26. The method of claim 25 wherein approximately 4 mg of $CaCO_3$ is added to the sidestream nitrification system per milligram of ammonia nitrogen in the sidestream nitrification system.

* * * * *